(12) United States Patent
Bratt et al.

(10) Patent No.: US 8,773,457 B2
(45) Date of Patent: Jul. 8, 2014

(54) COLOR SPACE CONVERSION

(75) Inventors: Joseph P. Bratt, San Jose, CA (US); Peter F. Holland, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 481 days.

(21) Appl. No.: 12/950,185

(22) Filed: Nov. 19, 2010

(65) Prior Publication Data

US 2012/0127364 A1    May 24, 2012

(51) Int. Cl.
*G09G 5/02*        (2006.01)
*H04N 9/67*        (2006.01)

(52) U.S. Cl.
CPC ............. *H04N 9/67* (2013.01); *G09G 2340/06* (2013.01)
USPC ........... 345/604; 345/589; 345/590; 345/600; 345/549

(58) Field of Classification Search
CPC ..... G09G 5/02; G09G 5/026; G09G 2340/06; G09G 2340/10; G06T 3/4007
See application file for complete search history.

(56) References Cited

U.S. PATENT DOCUMENTS

| | | | |
|---|---|---|---|
| 7,330,286 B2 * | 2/2008 | Fukasawa | 358/1.9 |
| 7,746,411 B1 | 6/2010 | Balram et al. | |
| 7,924,292 B2 * | 4/2011 | Bujold et al. | 345/603 |
| 2003/0206180 A1 * | 11/2003 | Ehlers et al. | 345/604 |
| 2008/0231579 A1 * | 9/2008 | Vasquez et al. | 345/98 |
| 2009/0123089 A1 | 5/2009 | Karlov et al. | |

* cited by examiner

*Primary Examiner* — Antonio A Caschera
(74) *Attorney, Agent, or Firm* — Lawrence J. Merkel; Meyertons, Hood, Kivlin, Kowert & Goetzel, P.C.

(57) ABSTRACT

A display pipe may include a video pipe outputting pixels of a video stream in a first color space, e.g. YCbCr color space. The display pipe may also include a first color space converter to convert the output pixels to a second color space, e.g. to RGB color space, producing a conversion output in which some of the converted output pixels have values that are invalid pixel values in the second color space. The display pipe may also include a blend unit that performs blending operations in the second color space on the converted output pixels to produce a blended conversion output that includes blended pixels in the second color space. A second color space converter in the display pipe may convert the blended pixels from the second color space to the first color space, and correctly display the converted blended pixels on a display screen.

21 Claims, 6 Drawing Sheets

COLOR SPACE CONVERSION

BACKGROUND

1. Field of the Invention

This invention is related to the field of graphical information processing, and more particularly to conversion from one color space to another.

2. Description of the Related Art

Part of the operation of many computer systems, including portable digital devices such as mobile phones, notebook computers and the like, is the use of some type of display device, such as a liquid crystal display (LCD), to display images, video information/streams, and data. Accordingly, these systems typically incorporate functionality for generating images and data, including video information, which are subsequently output to the display device. Such devices typically include video graphics circuitry to process images and video information for subsequent display.

In digital imaging, the smallest item of information in an image is called a "picture element", more generally referred to as a "pixel". For convenience, pixels are generally arranged in a regular two-dimensional grid. By using this arrangement, many common operations can be implemented by uniformly applying the same operation to each pixel independently. Since each pixel is an elemental part of a digital image, a greater number of pixels can provide a more accurate representation of the digital image. The intensity of each pixel can vary, and in color systems each pixel has typically three or four components such as red, green, blue, and black.

Most images and video information displayed on display devices such as LCD screens are interpreted as a succession of image frames, or frames for short. While generally a frame is one of the many still images that make up a complete moving picture or video stream, a frame can also be interpreted more broadly as simply a still image displayed on a digital (discrete, or progressive scan) display. A frame typically includes a specified number of pixels according to the resolution of the image/video frame. Information associated with a frame typically includes color values for every pixel to be displayed on the screen. Color values are commonly stored in 1-bit monochrome, 4-bit palletized, 8-bit palletized, 16-bit high color and 24-bit true color formats. An additional alpha channel is oftentimes used to retain information about pixel transparency. The color values can represent information corresponding to any one of a number of color spaces. One color space is YPbPr, which is used in video electronics, and is commonly referred to as "component video". YPbPr is the analog representation of the YCbCr color space, which is associated with digital video. The YPbPr color space and YCbCr color space are numerically equivalent, with scaling and offsets applied to color values in the YPbPr color space to obtain corresponding color values in the YCbCr color space.

Color space conversion is the translation of the representation of a color value from one color space to another, and typically occurs in the context of converting an image that is represented in one color space to another color space, with the goal of making the translated image look as similar as possible to the original. For example, color values in the YPbPr color space are created from the corresponding gamma-adjusted color values in the RGB (red, green and blue) color space, using two defined constants $K_B$ and $K_R$. Consequently, the equations defining color values in the YCbCr color space are formed in a way that rotates the entire nominal RGB color space and scales it to fit within the larger YCbCr color space, resulting in some color values within the YCbCr color space that cannot be represented in the corresponding RGB color space within the nominal RGB range. This may present some difficulty in determining how to correctly interpret and convert certain color values from the YCbCr color space into color values in the RGB color space, and under certain conditions may lead to different visual results than expected and/or desired.

Other corresponding issues related to the prior art will become apparent to one skilled in the art after comparing such prior art with the present invention as described herein.

SUMMARY

In one set of embodiments, video pipes in a graphics processing/display system may support videos associated with a first color space, e.g. YCbCr color space, while blender units that receive the pixels (that make up the video signals) from the video pipes may operate in a second color space, e.g. in the RGB color space. Accordingly, the video processing system may support color space conversion from the first color space (e.g. the YCbCr color space) to the second color space (e.g. the RGB color space), prior to the pixels from the video pipes being provided to the blender unit. The frames output by the blender unit may be converted back to the first color space prior to their being provided to a display unit for display. There may be cases when colors represented in the first color space cannot be adequately and/or accurately represented in the second color space, for example when the first color space has a wider gamut than the second color space. The blender unit may be operated to work with color values in the second color space that do not represent actual valid pixel values in the second color space. Those color values may then be converted back to the correct values in the first color space. Accordingly, the color information from the original (first) color space may be maintained through the entire video processing pipeline, and may be displayed properly on all display devices that display the video frames.

In one set of embodiments, a display pipe may include a video pipe that outputs pixels of a video stream in a first (e.g. YCbCr) color space, and a first color space converter that converts the output pixels to a second (e.g. RGB) color space. The first color space converter may produce a conversion output that includes converted output pixels having values that are invalid pixel values in the second color space. The display pipe may further include a blend unit that performs blending operations on the converted output pixels in the second color space, to produce a blended conversion output having blended pixels. A second color space converter in the display pipe may convert the blended pixels from the second color space to the first color space. In some embodiments, the display pipe may also include video pipe buffers to store the converted output pixels and/or output buffers to store the blended pixels, and may provide the blended pixels from the output buffers to a display controller.

A video system may include a video pipe for performing operations on a video stream. The video system may further include one or more video buffers configured to store video frame information represented in part by a set of first pixels having values represented in a first (e.g. YCbCr) color space, and may also include one or more frame buffers configured to store image frame information represented in part by a set of second pixels having values represented in a second (e.g. RGB) color space. The video system may also include at least one user interface unit to fetch the second pixels from the frame buffers, and provide the second pixels to a blend unit. The video pipe may fetch the first pixels from the video buffers, process the first pixels, and convert the processed first pixels to the second color space to obtain converted processed first pixels having values represented in the second color space. At least a portion of the converted processed first pixels may have values that are not valid in the second color space. In other words, there might not be appropriate representations for some of the pixels from the first color space in the second color space, but such pixels may still be converted and given uniquely corresponding values in the second color space. The video pipe may blend at least a portion of the converted processed first pixels that have values that are not valid in the second color space with at least a portion of the second pixels, to produce blended pixels. The video pipe may then convert the blended pixels to the first color space to obtain converted blended pixels having values represented in the first color space.

In some embodiments, the video system may in addition include an output buffer, to which the blend unit may provide the converted blended pixels at a first clock rate to temporarily store the converted blended pixels in the buffer. A display controller, also included in the video system, may fetch the temporarily stored converted blended pixels from the output buffer at a second clock rate to provide the converted blended pixels to a display screen at the second clock rate to display the converted blended pixels on the display screen.

BRIEF DESCRIPTION OF THE DRAWINGS

The following detailed description makes reference to the accompanying drawings, which are now briefly described.

Figure 1:
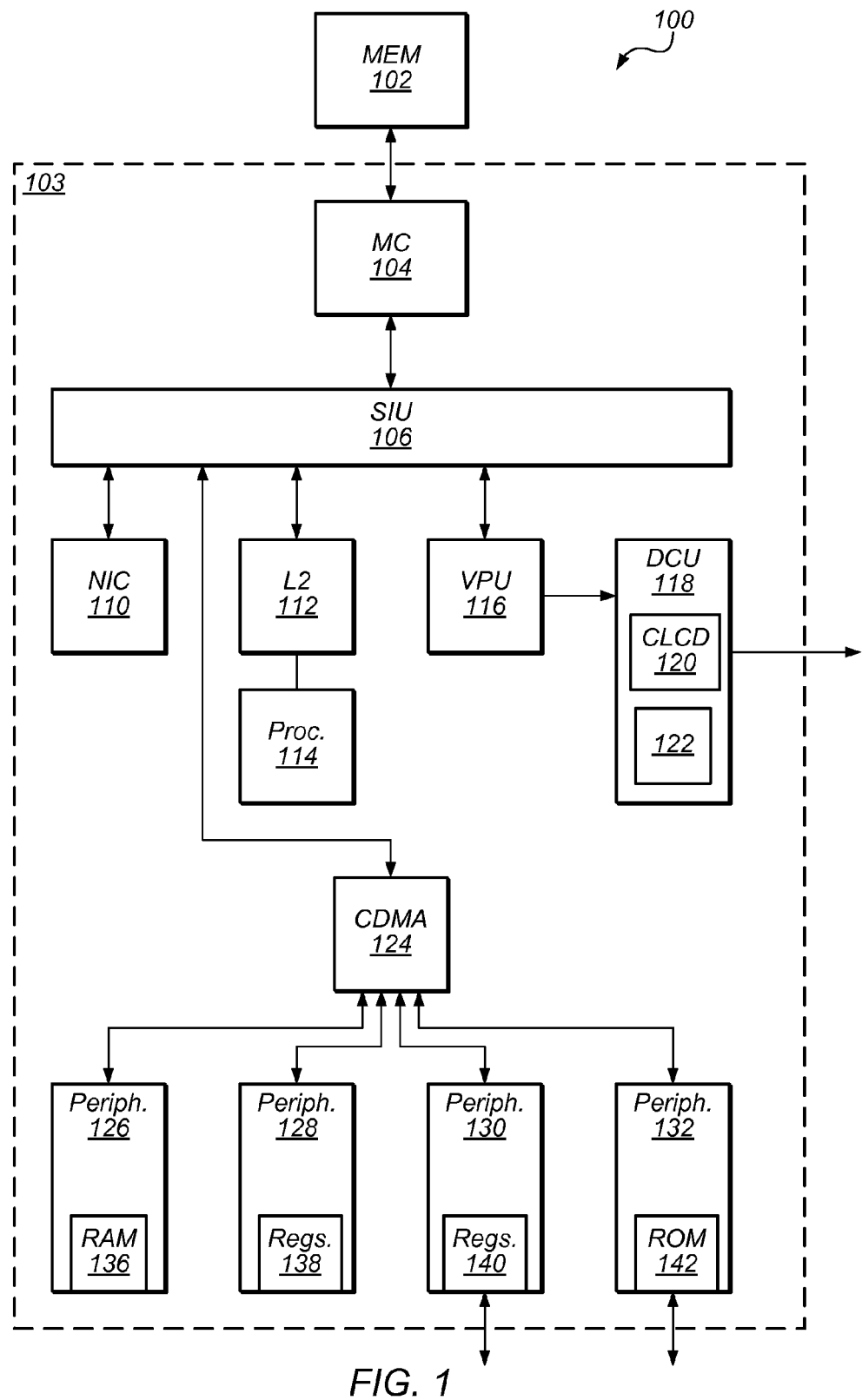
FIG. 1 is a block diagram of one embodiment of an integrated circuit that include a graphics display system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system 100 that includes an integrated circuit 103 coupled to external memory 102 is shown. In the illustrated embodiment, integrated circuit 103 includes a memory controller 104, a system interface unit (SIU) 106, a set of peripheral components such as components 126-128, a central DMA (CDMA) controller 124, a network interface controller (NIC) 110, a processor 114 with a level 2 (L2) cache 112, and a video processing unit (VPU) 116 coupled to a display control unit (DCU) 118. One or more of the peripheral components may include memories, such as random access memory (RAM) 136 in peripheral component 126 and read-only memory (ROM) 142 in peripheral component 132. One or more peripheral components 126-132 may also include registers (e.g. registers 138 in peripheral component 128 and registers 140 in peripheral component 130 in FIG. 1). Memory controller 104 is coupled to a memory interface, which may couple to memory 102, and is also coupled to SIU 106. CDMA controller 124, and L2 cache 112 are also coupled to SIU 106 in the illustrated embodiment. L2 cache 112 is coupled to processor 114, and CDMA controller 124 is coupled to peripheral components 126-132. One or more peripheral components 126-132, such as peripheral components 140 and 142, may be coupled to external interfaces as well.

SIU 106 may be an interconnect over which the memory controller 104, peripheral components NIC 110 and VPU 116, processor 114 (through L2 cache 112), L2 cache 112, and CDMA controller 124 may communicate. SIU 106 may implement any type of interconnect (e.g. a bus, a packet interface, point to point links, etc.). SIU 106 may be a hierarchy of interconnects, in some embodiments. CDMA controller 124 may be configured to perform DMA operations between memory 102 and/or various peripheral components 126-132. NIC 110 and VPU 116 may be coupled to SIU 106 directly and may perform their own data transfers to/from memory 102, as needed. NIC 110 and VPU 116 may include their own DMA controllers, for example. In other embodiments, NIC 110 and VPU 116 may also perform transfers through CDMA controller 124. Various embodiments may include any number of peripheral components coupled through the CDMA controller 124 and/or directly to the SIU 106. DCU 118 may include a display control unit (CLDC) 120 and buffers/registers 122. CLDC 120 may provide image/video data to a display, such as a liquid crystal display (LCD), for example. DCU 118 may receive the image/video data from VPU 116, which may obtain image/video frame information from memory 102 as required, to produce the image/video data for display, provided to DCU 118.

Processor 114 (and more particularly, instructions executed by processor 114) may program CDMA controller 124 to perform DMA operations. Various embodiments may program CDMA controller 124 in various ways. For example, DMA descriptors may be written to the memory 102, describing the DMA operations to be performed, and CDMA controller 124 may include registers that are programmable to locate the DMA descriptors in the memory 102. The DMA descriptors may include data indicating the source and target of the DMA operation, where the DMA operation transfers data from the source to the target. The size of the DMA transfer (e.g. number of bytes) may be indicated in the descriptor. Termination handling (e.g. interrupt the processor, write the descriptor to indicate termination, etc.) may be specified in the descriptor. Multiple descriptors may be created for a DMA channel, and the DMA operations described in the descriptors may be performed as specified. Alternatively, the CDMA controller 124 may include registers that are programmable to describe the DMA operations to be performed, and programming the CDMA controller 124 may include writing the registers.

Generally, a DMA operation may be a transfer of data from a source to a target that is performed by hardware separate from a processor that executes instructions. The hardware may be programmed using instructions executed by the processor, but the transfer itself is performed by the hardware independent of instruction execution in the processor. At least one of the source and target may be a memory. The memory may be the system memory (e.g. the memory 102), or may be an internal memory in the integrated circuit 103, in some embodiments. For example, a peripheral component 126-132 may include a memory that may be a source or target. In the illustrated embodiment, peripheral component 132 includes the ROM 142 that may be a source of a DMA operation. Some DMA operations may have memory as a source and a target (e.g. a first memory region in memory 102 may store the data to be transferred and a second memory region may be the target to which the data may be transferred). Such DMA operations may be referred to as "memory-to-memory" DMA operations or copy operations. Other DMA operations may have a peripheral component as a source or target. The peripheral component may be coupled to an external interface on which the DMA data is to be transferred or on which the DMA data is to be received. For example, peripheral components 130 and 132 may be coupled to interfaces onto which DMA data is to be transferred or on which the DMA data is to be received.

CDMA controller 124 may support multiple DMA channels. Each DMA channel may be programmable to perform a DMA via a descriptor, and the DMA operations on the DMA channels may proceed in parallel. Generally, a DMA channel may be a logical transfer path from a source to a target. Each channel may be logically independent of other DMA channels. That is, the transfer of data on one channel may not logically depend on the transfer of data on another channel. If two or more DMA channels are programmed with DMA operations, CDMA controller 124 may be configured to perform the transfers concurrently. For example, CDMA controller 124 may alternate reading portions of the data from the source of each DMA operation and writing the portions to the targets. CDMA controller 124 may transfer a cache block of data at a time, alternating channels between cache blocks, or may transfer other sizes such as a word (e.g. 4 bytes or 8 bytes) at a time and alternate between words. Any mechanism for supporting multiple DMA operations proceeding concurrently may be used.

CDMA controller 124 may include buffers to store data that is being transferred from a source to a destination, although the buffers may only be used for transitory storage. Thus, a DMA operation may include CDMA controller 124 reading data from the source and writing data to the destination. The data may thus flow through the CDMA controller 124 as part of the DMA operation. Particularly, DMA data for a DMA read from memory 124 may flow through memory controller 104, over SIU 106, through CDMA controller 124, to peripheral components 126-132, NIC 110, and VPU 116 (and possibly on the interface to which the peripheral component is coupled, if applicable). Data for a DMA write to memory may flow in the opposite direction. DMA read/write operations to internal memories may flow from peripheral components 126-132, NIC 110, and VPU 116 over SIU 106 as needed, through CDMA controller 124, to the other peripheral components (including NIC 110 and VPU 116) that may be involved in the DMA operation.

In one embodiment, instructions executed by the processor 114 may also communicate with one or more of peripheral components 126-132, NIC 110, VPU 116, and/or the various memories such as memory 102, or ROM 142 using read and/or write operations referred to as programmed input/output (PIO) operations. The PIO operations may have an address that is mapped by integrated circuit 103 to a peripheral component 126-132, NIC 110, or VPU 116 (and more particularly, to a register or other readable/writeable resource, such as ROM 142 or Registers 138 in the component, for example). It should also be noted, that while not explicitly shown in FIG. 1, NIC 110 and VPU 116 may also include registers or other readable/writeable resources which may be involved in PIO operations. PIO operations directed to memory 102 may have an address that is mapped by integrated circuit 103 to memory 102. Alternatively, the PIO operation may be transmitted by processor 114 in a fashion that is distinguishable from memory read/write operations (e.g. using a different command encoding then memory read/write operations on SIU 106, using a sideband signal or control signal to indicate memory vs. PIO, etc.). The PIO transmission may still include the address, which may identify the peripheral component 126-132, NIC 110, or VPU 116 (and the addressed resource) or memory 102 within a PIO address space, for such implementations.

In one embodiment, PIO operations may use the same interconnect as CDMA controller 124, and may flow through CDMA controller 124, for peripheral components that are coupled to CDMA controller 124. Thus, a PIO operation may be issued by processor 114 onto SIU 106 (through L2 cache 112, in this embodiment), to CDMA controller 124, and to the targeted peripheral component. Alternatively, the peripheral components 126-132 may be coupled to SIU 106 (much like NIC 110 and VPU 116) for PIO communications. PIO operations to peripheral components 126-132 may flow to the components directly from SIU 106 (i.e. not through CDMA controller 124) in one embodiment.

Generally, a peripheral component may include any desired circuitry to be included on integrated circuit 103 with the processor. A peripheral component may have a defined functionality and interface by which other components of integrated circuit 103 may communicate with the peripheral component. For example, a peripheral component such as VPU 116 may include video components such as a display pipe, which may include graphics processors, and a peripheral such as DCU 118 may include other video components such as display controller circuitry. NIC 110 may include networking components such as an Ethernet media access controller (MAC) or a wireless fidelity (WiFi) controller. Other peripherals may include audio components such as digital signal processors, mixers, etc., controllers to communicate on various interfaces such as universal serial bus (USB), peripheral component interconnect (PCI) or its variants such as PCI express (PCIe), serial peripheral interface (SPI), flash memory interface, etc.

As mentioned previously, one or more of the peripheral components 126-132, NIC 110 and VPU 116 may include registers (e.g. registers 138-140 as shown, but also registers, not shown, in NIC 110 and/or within VPU 116) that may be addressable via PIO operations. The registers may include configuration registers that configure programmable options of the peripheral components (e.g. programmable options for video and image processing in VPU 116), status registers that may be read to indicate status of the peripheral components, etc. Similarly, peripheral components may include memories such as ROM 142. ROMs may store data used by the peripheral that does not change, code to be executed by an embedded processor within the peripheral component 126-132, etc.

Memory controller 104 may be configured to receive memory requests from system interface unit 106. Memory controller 104 may be configured to access memory to complete the requests (writing received data to the memory for a write request, or providing data from memory 102 in response to a read request) using the interface defined the attached memory 102. Memory controller 104 may be configured to interface with any type of memory 102, such as dynamic random access memory (DRAM), synchronous DRAM (SDRAM), double data rate (DDR, DDR2, DDR3, etc.) SDRAM, Low Power DDR2 (LPDDR2) SDRAM, RAMBUS DRAM (RDRAM), static RAM (SRAM), etc. The memory may be arranged as multiple banks of memory, such as dual inline memory modules (DIMMs), single inline memory modules (SIMMs), etc. In one embodiment, one or more memory chips are attached to the integrated circuit 10 in a package on package (POP) or chip-on-chip (COC) configuration.

It is noted that other embodiments may include other combinations of components, including subsets or supersets of the components shown in FIG. 1 and/or other components. While one instance of a given component may be shown in FIG. 1, other embodiments may include one or more instances of the given component.

Figure 2:
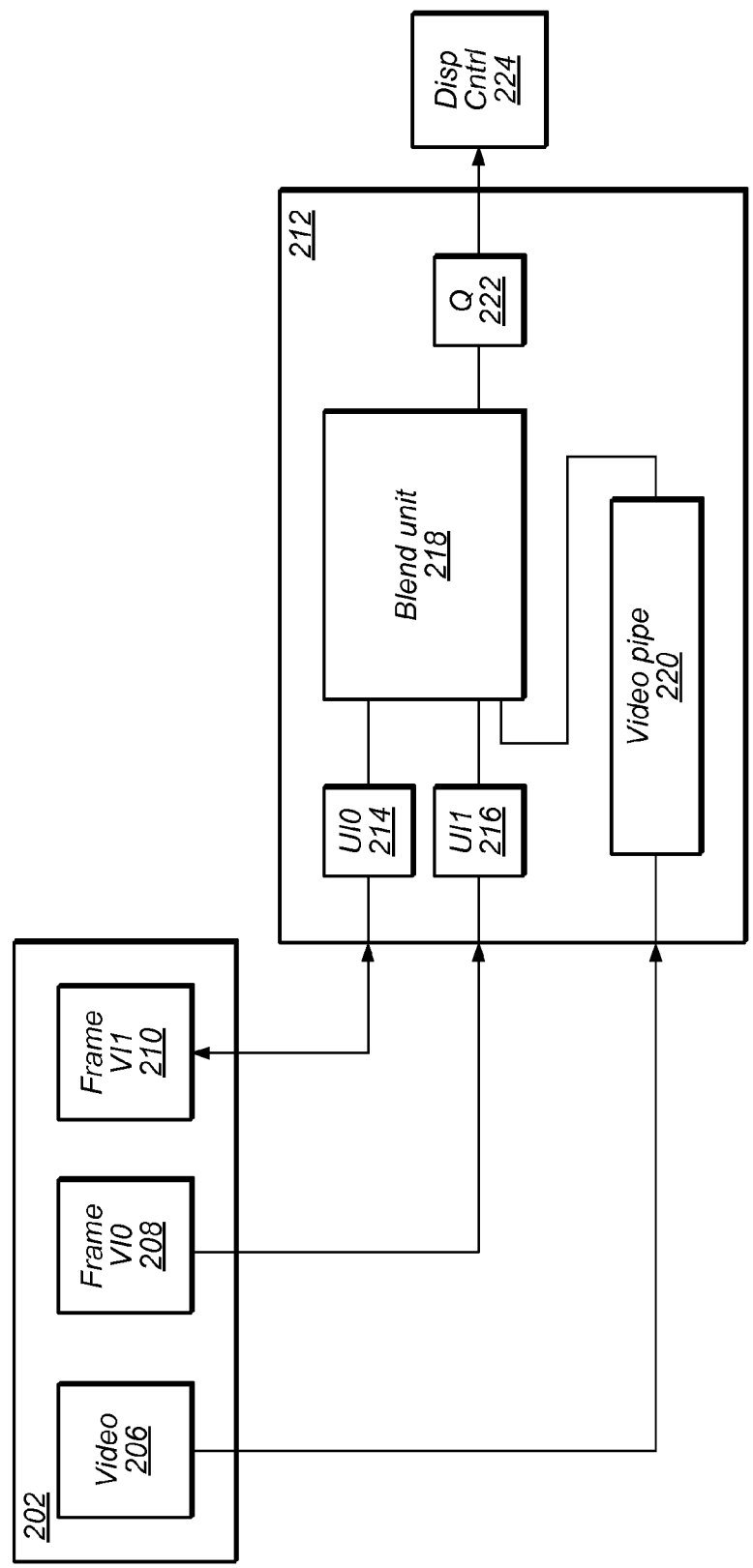
FIG. 2 is a block diagram of one embodiment of a graphics display system including system memory.

Turning now to FIG. 2, a partial block diagram is shown providing an overview of an exemplary system in which image frame information may be stored in memory 202, which may be system memory, and provided to a display pipe 212. As shown in FIG. 2, memory 202 may include a video buffer 206 for storing video frames/information, and one or more (in the embodiment shown, a total of two) image frame buffers 208 and 210 for storing image frame information. In some embodiments, the video frames/information stored in video buffer 206 may be represented in a first color space, according the origin of the video information. For example, the video information may be represented in the YCbCr color space. At the same time, the image frame information stored in image frame buffers 208 and 210 may be represented in a second color space, according to the preferred operating mode of display pipe 212. For example, the image frame information stored in image frame buffers 208 and 210 may be represented in the RGB color space. Display pipe 212 may include one or more user interface (UI) units, shown as UI 214 and 216 in the embodiment of FIG. 2, which may be coupled to memory 202 from where they may fetch the image frame data/information. A video pipe or processor 220 may be similarly configured to fetch the video data from memory 202, more specifically from video buffer 206, and perform various operations on the video data. UI 214 and 216, and video pipe 220 may respectively provide the fetched image frame information and video image information to a blend unit 218 to generate output frames that may be stored in a buffer 222, from which they may be provided to a display controller 224 for display on a display device (not shown), for example an LCD.

In one set of embodiments, UI 214 and 216 may include one or more registers programmable to define at least one active region per frame stored in buffers 208 and 210. Active regions may represent those regions within an image frame that contain pixels that are to be displayed, while pixels outside of the active region of the frame are not to be displayed. In order to reduce the number of accesses that may be required to fetch pixels from frame buffers 208 and 210, when fetching frames from memory 202 (more specifically from frame buffers 208 and 210), UI 214 and 216 may fetch only those pixels of any given frame that are within the active regions of the frame, as defined by the contents of the registers within UI 214 and 216. The pixels outside the active regions of the frame may be considered to have an alpha value corresponding to a blend value of zero. In other words, pixels outside the active regions of a frame may automatically be treated as being transparent, or having an opacity of zero, thus having no effect on the resulting display frame. Consequently, the fetched pixels may be blended with pixels from other frames, and/or from processed video frame or frames provided by video pipe 220 to blend unit 218.

Figure 3:
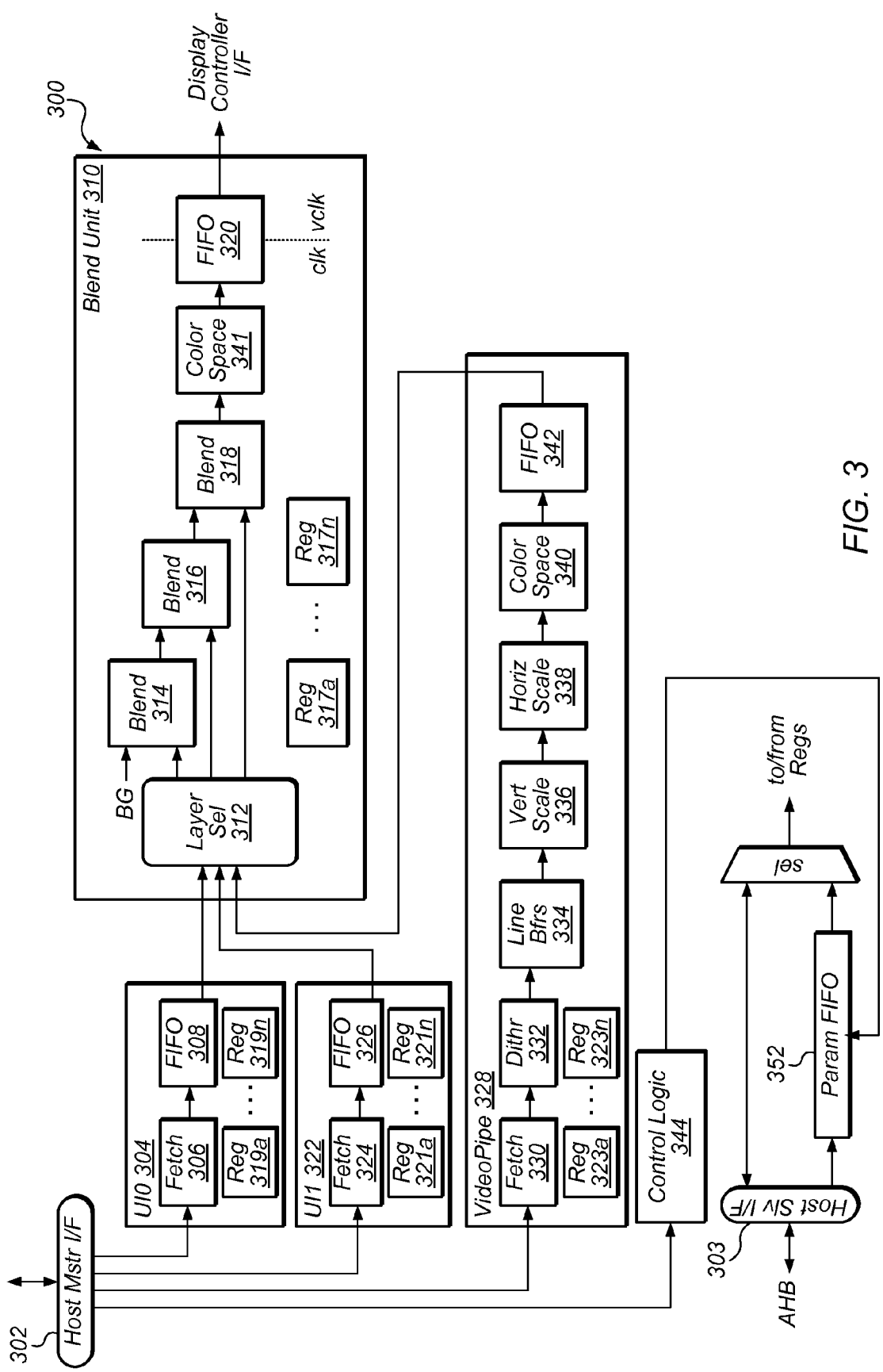
FIG. 3 is a block diagram of one embodiment of a display pipe in a graphics display system.

Turning now to FIG. 3, a more detailed logic diagram of one embodiment 300 of display pipe 212 is shown. In one set of embodiments, display pipe 300 may function to deliver graphics and video data residing in memory (or some addressable form of memory, e.g. memory 202 in FIG. 2) to a display controller or controllers that may support both LCD and analog/digital TV displays. The video data, which may be represented in a first color space, likely the YCbCr color space, may be dithered, scaled, converted to a second color space (for example the RGB color space) for use in blend unit 310, and blended with up to a specified number (e.g. 2) of graphics (user interface) planes that are also represented in the second (i.e. RGB) color space. Display pipe 300 may run in its own clock domain, and may provide an asynchronous interface to the display controllers to support displays of different sizes and timing requirements. Display pipe 300 may include one or more (in this case two) user interface (UI) blocks 304 and 322 (which may correspond to UI 214 and 216 of FIG. 2), a blend unit 310 (which may correspond to blend unit 218 of FIG. 2), a video pipe 328 (which may correspond to video pipe 220 of FIG. 2), a parameter FIFO 352, and Master and Slave Host Interfaces 302 and 303, respectively. The blocks shown in the embodiment of FIG. 3 may be modular, such that with some redesign, user interfaces and video pipes may be added or removed, or host master or slave interfaces 302 and 303 may be changed, for example.

Display pipe 300 may be designed to fetch data from memory, process that data, then presents it to an external display controller through an asynchronous FIFO 320. The display controller may control the timing of the display through a Vertical Blanking Interval (VBI) signal that may be activated at the beginning of each vertical blanking interval. This signal may cause display pipe 300 to initialize (Restart) and start (Go) the processing for a frame (more specifically, for the pixels within the frame). Between initializing and starting, configuration parameters unique to that frame may be modified. Any parameters not modified may retain their value from the previous frame. As the pixels are processed and put into output FIFO 320, the display controller may issue signals (referred to as pop signals) to remove the pixels at the display controller's clock frequency (indicated as vclk in FIG. 3).

In the embodiment shown in FIG. 3, each UI unit may include one or more registers 319a-319n and 321a-321n, respectively, to hold image frame information that may include active region information, base address information, and/or frame size information among others. Each UI unit may also include a respective fetch unit, 306 and 324, respectively, which may operate to fetch the frame information, or more specifically the pixels contained in a given frame from memory, through host master interface 302. As previously mentioned, the pixel values may be represented in the color space designated as the operating color space of the blend unit, in this case the RGB color space. In one set of embodiments, fetch units 306 and 324 may only fetch those pixels of any given frame that are within the active region of the given frame, as defined by the contents of registers 319a-319n and 321a-321n. The fetched pixels may be fed to respective FIFO buffers 308 and 326, from which the UI units may provide the fetched pixels to blend unit 310, more specifically to a layer select unit 312 within blend unit 310. Blend unit 310 may then blend the fetched pixels obtained from UI 304 and 322 with pixels from other frames and/or video pixels obtained from video pipe 328. The pixels may be blended in blend elements 314, 316, and 318 to produce an output frame or output frames, which may then be passed to FIFO 320 to be retrieved by a display controller interface coupling to FIFO 320, to be displayed on a display of choice, for example an LCD. In one set of embodiments, the output frame(s) may be converted back to the original color space of the video information, e.g. to the YCbCr color space, to be displayed on the display of choice, The overall operation of blend unit 310 will now be described. Blend unit 310 may be situated at the backend of display pipe 300 as shown in FIG. 3. It may receive frames of pixels represented in a second color space (e.g. RGB) from UI 304 and 322, and pixels represented in a first color space (e.g. YCbCr) from video pipe 328, and may blend them together layer by layer, through layer select unit 312, once the pixels obtained from video pipe 328 have been converted to the second color space, as will be further described below. The final resultant pixels (which may be RGB of 10-bits each) may be converted to the first color space through color space converter unit 341 (as will also be further described below), queued up in output FIFO 320 at the video pipe's clock rate of clk, and fetched by a display controller at the display controller's clock rate of vclk. It should be noted that while FIFO 320 is shown inside blend unit 310, alternative embodiments may position FIFO 320 outside blend unit 310 and possibly within a display controller unit. In addition, while color space conversion by converter unit 341 is shown to take place prior to providing the resultant pixels to FIFO 320, in alternate embodiments the color conversion may be performed on the data fetched from FIFO 320.

The sources to blend unit 310 (UI 304 and 326, and/or video pipe 328) may provide the pixel data and per-pixel Alpha values (which may be 8-bit and define the transparency for the given pixel) for an entire frame with width, display width, and height, display height, in pixels starting at a specified default pixel location, (e.g. 0,0). Blend unit 310 may functionally operate on a single layer at a time. The lowest level layer may be defined as the background color (BG, provided to blend element 314). Layer 1 may blend with layer 0 (at blend element 316). The next layer, layer 2, may blend with the output from blend element 316 (at blend element 318), and so on until all the layers are blended. For the sake of simplicity, only three blend elements 314-318 are shown, but display pipe 300 may include more or less blend elements depending on the desired number of processed layers. Each layer (starting with layer 1) may specify where its source comes from to ensure that any source may be programmatically selected to be on any layer. As mentioned above, as shown, blend unit 310 has three sources (UI 304 and 322, and video pipe 328) to be selected onto three layers (using blend elements 314-318). A CRC (cyclic redundancy check) may also be performed on the output of blend unit 310. Blend unit 310 may also be put into a CRC only mode, where only a CRC is performed on the output pixels without them being sent to the display controller.

Each source (UI 304 and 322, and video pipe 328) may provide a per pixel Alpha value. The Alpha values may be used to perform per-pixel blending, may be overridden with a static per-frame Alpha value (e.g. saturated Alpha), or may be combined with a static per-frame Alpha value (e.g. Dissolve Alpha). Any pixel locations outside of a source's valid region may not be used in the blending. The layer underneath it may show through as if that pixel location had an Alpha of zero. An Alpha of zero for a given pixel may indicate that the given pixel is invisible, and will not be displayed.

In one set of embodiments, valid source regions, referred to as active regions may be defined as the area within a frame that contains valid pixel data. Pixel data for an active region may be fetched from memory by UI 304 and 322, and stored within FIFOs 308 and 326, respectively. An active region may be specified by starting and ending (X,Y) offsets from an upper left corner (0,0) of the entire frame. The starting offsets may define the upper left corner of the active region, and the ending offsets may define the pixel location after the lower right corner of the active region. Any pixel at a location with coordinates greater than or equal to the starting offset and less than the ending offset may be considered to be in the valid region. Any number of active regions may be specified. For example, in one set of embodiments there may be up to four active regions defined within each frame and may be specified by region enable bits. The starting and ending offsets may be aligned to any pixel location. An entire frame containing the active regions may be sent to blend unit 310. Any pixels in the frame, but not in any active region would not be displayed, and may therefore not participate in the blending operation, as if the pixels outside of the active had an Alpha value of zero. In alternate embodiments, blend unit 310 may be designed to receive pixel data for only the active regions of the frame instead of receiving the entire frame, and automatically treat the areas within the frame for which it did not receive pixels as if it had received pixels having a blending value (Alpha value) of zero.

In one set of embodiments, one active region may be defined within UI 304 (in registers 319a-319n) and/or within UI 322 (in registers 321a-321n), and may be relocated within the display destination frame. Similar to how active regions within a frame may be defined, the frame may be defined by the pixel and addressing formats, but only one active region may be specified. This active region may be relocated within the destination frame by providing an X and Y pixel offset within that frame. The one active region and the destination position may be aligned to any pixel location. It should be noted that other embodiments may equally include a combination of multiple active regions being specified by storing information defining the multiple active regions in registers 319a-319n and in registers 321a-321n, and designating one or more of these active regions as active regions that may be relocated within the destination frame as described above.

Figure 4:
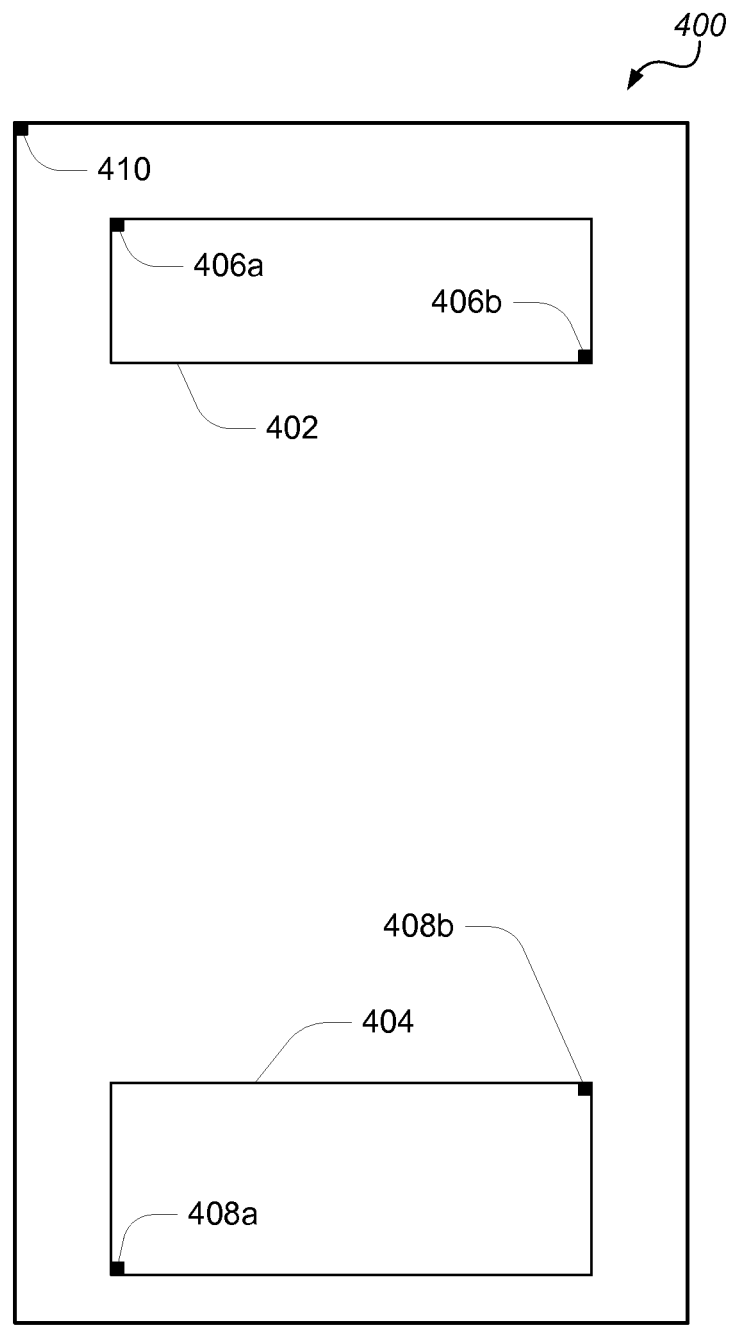
FIG. 4 is an illustration of one example of an image frame containing active regions.

Turning now to FIG. 4, an example drawing is provided of a frame 400 that includes two active regions. As previously mentioned, any number of active regions within a frame may be defined, though only two active regions are defined in example frame 400. An upper left corner pixel 410 of frame 400 may be defined as a (0,0) coordinate position, based on which active regions 402 and 404 may be defined. For example, active region 402 may be defined based on pixels 406a and 406b, defining the upper left corner and lower right corner, respectively, of active region 402. Similarly, active region 404 may be defined based on pixels 408a and 4068, defining the lower left corner and upper right corner, respectively, of active region 404. Overall, any two corners situated diametrically opposite each other within an active region may be used to define the active region. The position of the active region may then be defined by providing offset values for pixels 406a and 406b, and offset values for pixels 408a and 408b from any specified reference point of the frame, for example from the (0,0) position.

In one set of embodiments, the active regions in a frame may represent graphics overlay to appear on top of another image or a video stream. For example, the active regions may represent a static image superimposed atop a video stream. In some embodiments, active regions may more generally represent an overlay window that may be used to superimpose any desired information atop information presented in the background layer underneath. For example, display pipe 212 may include more than one video pipe similar to video pipe 220 (or 328, as shown in FIG. 3), and overlay video information in the active region. Similarly, instead of a video stream, static images may be displayed underneath the active regions, and so forth. Referring again to FIG. 3, video pipe 328 may provide a video stream to blend unit 310, while UI 304 and 322 may provide image frames with pixels in the active region representing a static image overlay to be displayed atop the video stream. In this case, the output frames provided from FIFO 320 to the display controller may include video pixel information from video pipe 328, with the fetched pixels from FIFOs 308 and/or 326 superimposed on top of the video pixel information, blended together by blend unit 310 according to the Alpha values and other pertinent characteristics of the fetched pixels. Again, different embodiments may include various combinations of video and static image information blended and displayed in a manner similar to what is shown in FIG. 4, with the functionality of the display pipe expanded accordingly with additional video pipes and/or user interfaces as needed. Blend unit 310 may similarly be expanded to accommodate the additional pixels that may need to be blended.

In one set of embodiments, using fetch unit 330, video pipe 328 may fetch video frame data/information from memory through host master interface 302. The video frame data/information may be represented in a given color space, for example YCbCr color space. Video pipe 328 may insert random noise (dither) into the samples (dither unit 332), and scale that data in both vertical and horizontal directions (scalers 336 and 338) after buffering the data (buffers 334). In some embodiments, blend unit 310 may expect video (pixel) data to be represented in a different color space than the original color space (which, as indicated above, may be the YCbCr color space). In other words, blend unit 310 may operate in a second color space, e.g. in the RGB color space. Therefore, the video frame data may be converted from the first color space, in this case the YCbCr color space, to the second color space, in this case the RGB color space, by color space converter unit 340. It should be noted that while color space converter unit 340 is shown situated within video pipe 328, it may be situated anywhere between the output provided by video pipe 328 and the input provided to blend unit 310, as long as the data that is ready to be provided to blend unit 310 has been converted from the first color space to the second color space prior to the data being processed and/or operated upon by blend unit 310.

The converted data (that is, data that is represented in the second color space, in this case in the RGB color space) may then be buffered (FIFO 342), before being provided to blend unit 310 to be blended with other planes represented in the second color space, as previously discussed. During the process of converting data represented in the first color space into data represented in the second color space, there may be some colors represented in the first (i.e. the YCbCr) color space that cannot be represented in the second (i.e. RGB) color space. For example, the conversion may yield an R, G, or B component value of greater than 1 or less than 0. Displaying videos on certain display devices may therefore yield different visual results than desired and/or expected. Therefore, in at least one set of embodiments, blend unit 310 may be designed to perform blending operations using the converted pixel values even when the converted pixel values do not represent valid pixel values in the second color space. For example, if the second color space (or the operating color space of blend unit 310) is the RGB color space, blend unit 310 may allow RGB values as high as +4 and as low as −4. Of course these values may be different, and may also depend on what the original color space is. While these values may not represent valid pixel values in the second (i.e. RGB) color space, they can be converted back to the correct values in the first (i.e. the YCbCr) color space. Accordingly, the color information from the original (YCbCr) color space may be maintained through video pipe 328, and may be displayed properly on all display devices that display the video frames.

Thus, before displaying the blended pixels output by blend element 318, the blended pixels may be converted from the second color space (i.e. RGB in this case) to the original video color space (i.e. the YCbCr color space in this case) through color space conversion unit 341. As was the case with video pipe 328, while color space conversion unit 341 is shown situated within blend unit 310 and between blend element 318 and FIFO 320, in alternate embodiments the color space conversion may be performed on the display controller side, prior to being provided to the display, and various other embodiments are not meant to be limited by the embodiment shown in FIG. 3.

In one set of embodiments, a parameter FIFO 352 may be used to store programming information for registers 319a-319n, 321a-321n, 317a-317n, and 323a-323n. Parameter FIFO 352 may be filled with this programming information by control logic 344, which may obtain the programming information from memory through host master interface 302. In some embodiments, parameter FIFO 352 may also be filled with the programming information through an advanced high-performance bus (AHB) via host slave interface 303.

Figure 5:
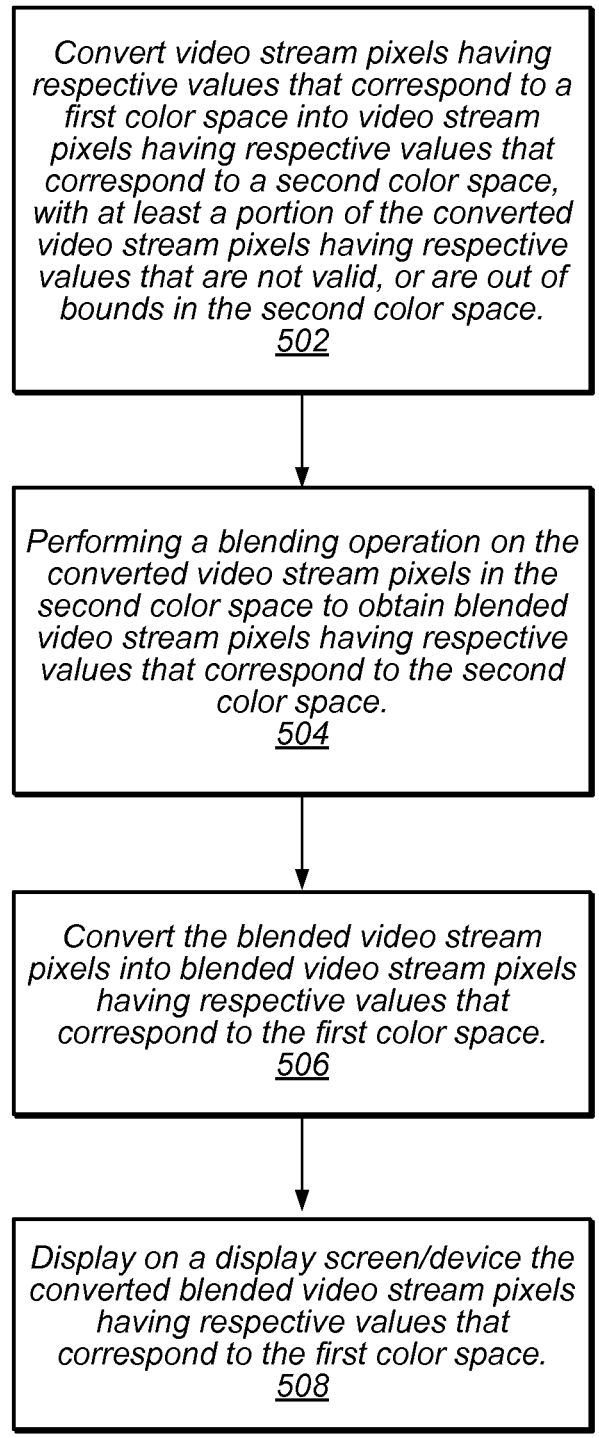
FIG. 5 is a flow chart illustrating one embodiment of a method for operating a video system.

Turning now to FIG. 5, a flowchart is shown illustrating one embodiment of a method for operating a video system. Video stream pixels having respective values that correspond to a first (e.g. YCbCr) color space may be converted into video stream pixels having respective values that correspond to a second (e.g. RGB) color space (502). At least a portion of the converted video stream pixels may have respective values that are not valid, or are out of bounds in the second color space. E.g., when converting from the YCbCr color space to the RGB color space, some of the converted video stream pixels may have values as high as +4 and/or as low as −4. A blending operation may then be performed on the converted video stream pixels in the second color space to obtain blended video stream pixels having respective values that correspond to the second color space (504). The blended video stream pixels may be subsequently converted into blended video stream pixels having respective values that correspond to the first color space (506), and the converted blended video stream pixels having respective values that correspond to the first color space may then be displayed on a display screen/device (508). As a result of allowing for out of bounds values for some (or all) of the converted video stream pixels in the second color space, the converted blended pixels are accurately displayed on the display screen/device.

Figure 6:
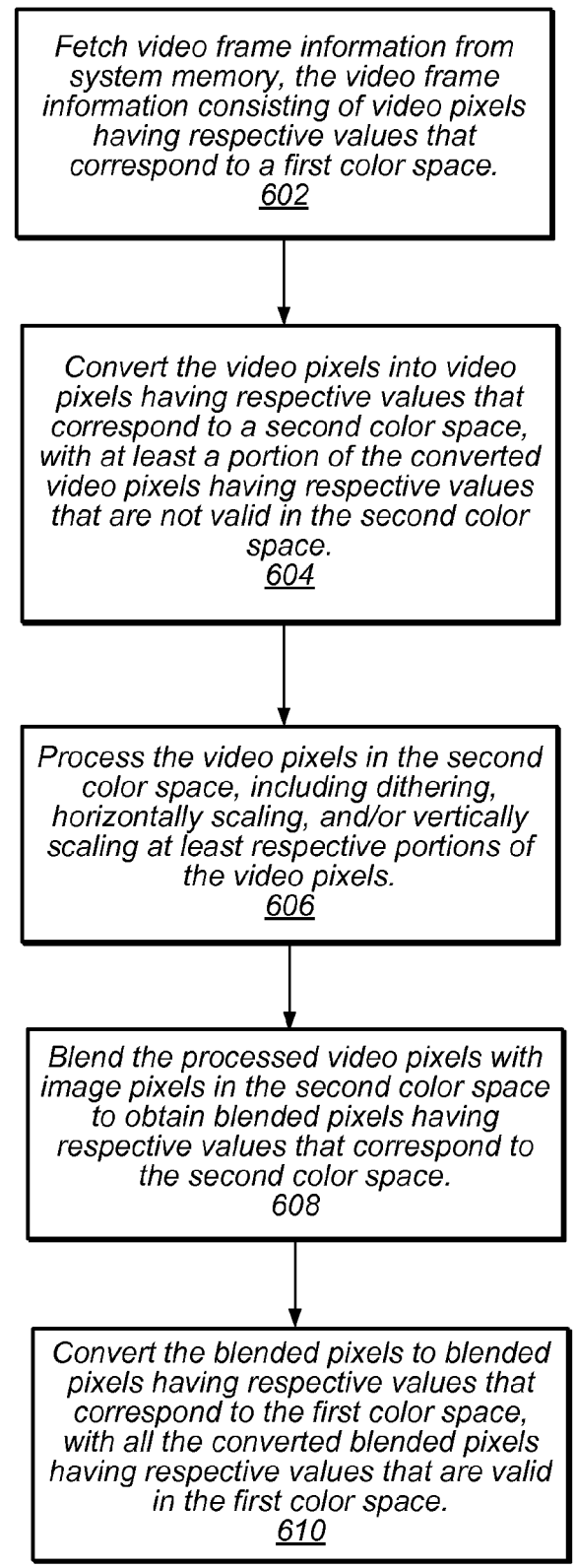
FIG. 6 is a flow chart illustrating how video information may be processed and blended with other pixels according to one embodiment.

Turning now to FIG. 6, a flowchart is shown illustrating operation of how video information may be processed and blended with other pixels according to one embodiment. Video frame information may be fetched from system memory, the video frame information including video pixels having respective values that correspond to a first (e.g. YCbCr) color space (602). The fetched video pixels may be converted into video pixels having respective values that correspond to a second (e.g. RGB) color space, with at least a portion of the converted video pixels having respective values that are not valid in the second color space (604). In other words, some of the video pixels may have values in the YCbCr color space that do not have corresponding valid values in the RGB color space. However, instead of adjusting the converted values to obtain valid values in the RGB color space, the converted values may be out of bounds in the RGB color space while maintaining a one-to-one correspondence with the original value in the YCbCr color space. The converted video pixels may then be processed in the second color space, including dithering, horizontally scaling, and/or vertically scaling at least respective portions of the video pixels (606). The processed video pixels may be blended with image pixels in the second color space to obtain blended pixels having respective values that correspond to the second color space (608), and the blended pixels may be converted to blended pixels having respective values that correspond to the first color space (610). As a result of maintaining the one-to-one correspondence between respective values representative of the first color space and the second color space, even when a corresponding value isn't valid in the second color space, all the converted blended pixels have respective values that are valid in the first color space, and may therefore be correctly displayed.

Numerous variations and modifications will become apparent to those skilled in the art once the above disclosure is fully appreciated. It is intended that the following claims be interpreted to embrace all such variations and modifications.

We claim:

1. A display pipe comprising:
    a video pipe configured to output pixels of a video stream in a first color space;
    a first color space converter configured to convert the output pixels to a second color space, wherein the first color space converter is configured to produce a conversion output that comprises converted output pixels having values that are invalid pixel values in the second color space;
    a blend unit configured to perform blending operations in the second color space on the converted output pixels to produce a blended conversion output comprising blended pixels that include pixels having invalid pixel values in the second color space; and
    a second color space converter configured to convert the blended pixels from the second color space back to the first color space, wherein the converted blended pixels in the first color space all have valid pixel values in the first color space.

2. The display pipe as recited in claim 1, further comprising at least one of:
    one or more first buffers configured to store the converted output pixels; and
    one or more second buffers configured to store the blended pixels.

3. The display pipe as recited claim 1, wherein the first color space is the YCbCr color space and the second color space is the RGB color space.

4. The display pipe as recited in claim 1, wherein the display pipe is configured to provide the converted blended pixels to a display controller to be displayed on a display screen.

5. A video system comprising:
    a video pipe configured to:
        process first pixels having values represented in a first color space; and
        convert the processed first pixels to a second color space to obtain converted processed first pixels having values represented in the second color space, wherein at least a portion of the converted processed first pixels have values that are not valid in the second color space; and
    a blend unit configured to:
        receive second pixels having values represented in the second color space;
        blend at least a portion of the converted processed first pixels having values that are not valid in the second color space with at least a portion of the second pixels, to produce blended pixels that include pixels having invalid pixel values in the second color space; and
        convert the blended pixels back to the first color space to obtain converted blended pixels having values represented in the first color space, wherein the converted blended pixels all have valid pixel values in the first color space.

6. The video system of claim 5, further comprising:
    at least one video buffer configured to store video frame information that comprises the first pixels, prior to the video pipe processing the first pixels; and
    at least one frame buffer configured to store image frame information that comprises the second pixels, prior to the blend unit receiving the second pixels.

7. The video system as recited in claim 6, further comprising:
    at least one user interface unit configured to fetch the second pixels from the at least one frame buffer, and provide the second pixels to the blend unit;
    wherein the video pipe is further configured to fetch the first pixels from the at least one video buffer.

8. The video system of claim 5, further comprising a display controller configured to provide the converted blended pixels to a display screen at a first clock rate to display the converted blended pixels on the display screen.

9. The video system as recited in claim 8, further comprising:
    a buffer;
    wherein the blend unit is further configured to provide the converted blended pixels to the buffer at a second clock rate to temporarily store the converted blended pixels in the buffer; and
    wherein the display controller is further configured to fetch the temporarily stored converted blended pixels from the buffer at the first clock rate to provide the converted blended pixels to the display screen at the first clock rate.

10. A method comprising:
  converting, by a graphics processing system, video stream pixels having respective values that correspond to a first color space into video stream pixels having respective values that correspond to a second color space, wherein at least a portion of the converted video stream pixels have respective values that are not valid in the second color space;
  performing, by the graphics processing system, a blending operation on the converted video stream pixels in the second color space to obtain blended video stream pixels having respective values that correspond to the second color space, wherein the blended video stream pixels comprise pixels having invalid pixel values in the second color space; and
  converting, by the graphics processing system, the blended video stream pixels into blended video stream pixels having respective values that correspond to the first color space, wherein the converted blended video stream pixels all have valid pixel values in the first color space.

11. The method as recited in claim 10, further comprising displaying on a display device the blended video stream pixels having respective values that correspond to the first color space.

12. The method as recited in claim 10, wherein performing the blending operation comprises:
  blending the converted video stream pixels with pixels corresponding to one or more image frames having respective values that correspond to the second color space.

13. The method as recited in claim 12, wherein the one or more image frames represent graphics to be overlaid over a video stream represented by the converted video stream pixels.

14. A method comprising:
  fetching, by a graphics processing system, video frame information from system memory, the video frame information comprising video pixels having respective values that correspond to a first color space;
  converting, by the graphics processing system, the video pixels into video pixels having respective values that correspond to a second color space, wherein at least a portion of the converted video pixels have respective values that are not valid in the second color space;
  processing, by the graphics processing system, the video pixels in the second color space;
  blending, by the graphics processing system, the processed video pixels with image pixels in the second color space to obtain blended pixels having respective values that correspond to the second color space, wherein the blended pixels comprise pixels having invalid pixel values in the second color space; and
  converting, by the graphics processing system, the blended pixels to blended pixels having respective values that correspond to the first color space, wherein all the converted blended pixels have respective values that are valid in the first color space.

15. The method recited in claim 14, further comprising:
  fetching image frame information from the system memory, wherein the image frame information comprises the image pixels.

16. The method as recited in claim 14, wherein processing the video pixels in the second color space comprises at least one of:
  dithering at least a portion of the video pixels;
  vertically scaling at least a portion of the video pixels; and
  horizontally scaling at least a portion of the video pixels.

17. The method as recited in claim 14, further comprising:
  buffering the converted blended pixels; and
  providing the buffered converted blended pixels to a display controller to have the buffered converted blended pixels displayed on a display screen.

18. A system comprising:
  system memory configured to store:
    first visual information comprising first pixels having respective values that correspond to a first color space; and
    second visual information comprising second pixels having respective values that correspond to a second color space; and
  a display pipe configured to:
    fetch the first pixels and second pixels from the system memory;
    convert the second pixels into second pixels having respective values that correspond to the first color space, wherein at least a portion of the converted second pixels have respective values that are not valid in the first color space;
    blend the first pixels and the converted second pixels in the first color space to obtain blended pixels wherein the blended pixels comprise pixels having invalid values in the first color space;
    convert the blended pixels into converted blended pixels having respective values that correspond to the second color space, wherein the respective values of the converted blended pixels corresponding to the second color space are all valid pixel values in the second color space; and
    output the converted blended pixels.

19. The system as recited in claim 18, further comprising:
  a display controller configured to receive the converted pixels output by the display pipe, and display on a display screen visual information represented by the converted blended pixels based on the first visual information and the second visual information.

20. The system as recited in claim 18;
  wherein the first visual information comprises one or more of:
    static image information; or
    video image information; and
  wherein the second visual information comprises one or more of:
    static image information; or
    video image information.

21. The system as recited in claim 20, wherein the converted blended pixels represent visual information comprising the first visual information overlaid atop the second visual information.

* * * * *